April 8, 1958   D. W. DOUGLAS   2,829,638
PSYCHOGALVANOMETER
Filed Feb. 20, 1952
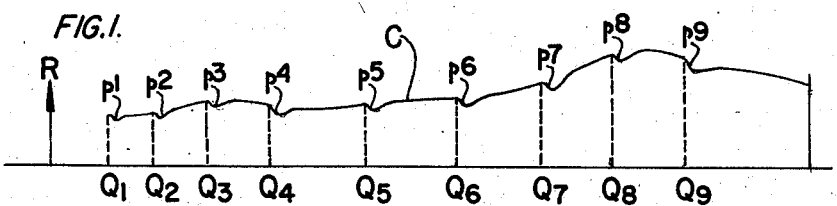
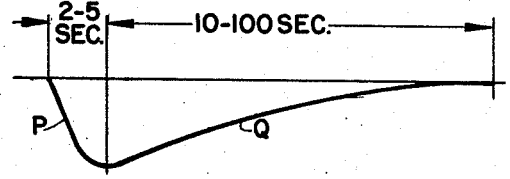
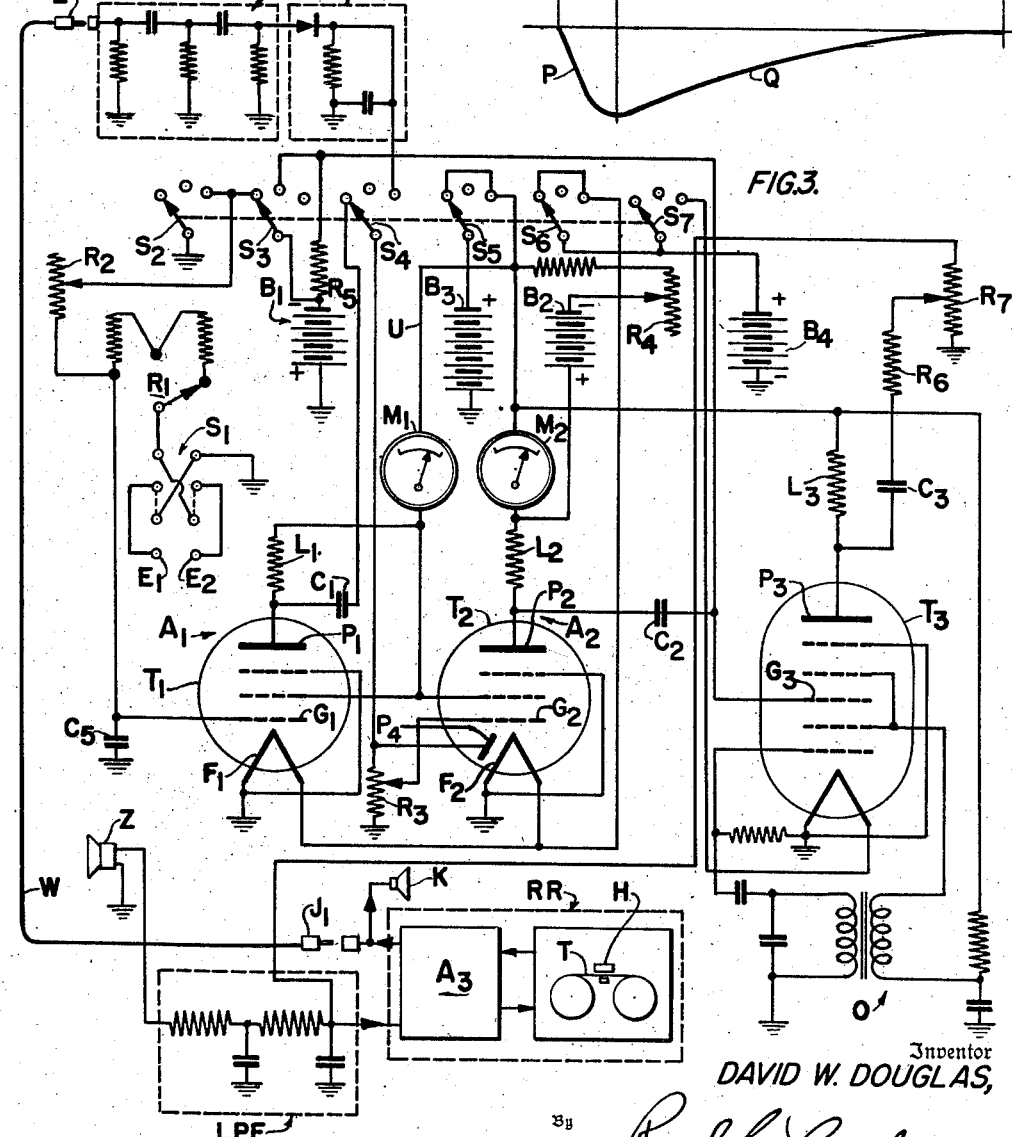
Inventor
DAVID W. DOUGLAS,
By Reed C. Lawlor
Attorney United States Patent Office 2,829,638
Patented Apr. 8, 1958

2,829,638
PSYCHOGALVANOMETER

David W. Douglas, Burbank, Calif., assignor to Clarkson T. Thompson, Tarzana, Calif.

Application February 20, 1952, Serial No. 272,609

13 Claims. (Cl. 128—21)

This invention relates to the art of psychogalvanometry, and more particularly to improvements in methods and apparatus for measuring physiological reflexes that are provoked by questions of an investigator or by other artificial stimuli.

It is well known that the resistance between points of the human skin changes in response to artificial stimuli that provoke emotions. Such changes in skin resistance result from neurological phenomena that are manifested primarily by increased activity of the sweat glands in the skin. Such changes in resistance are sometimes referred to as electrodermal or psychogalvanic reflexes. Skin resistance also depends upon other variables, such as temperature, humidity, texture of the skin, fatigue, and the general emotional character of the subject. The analysis of electrodermal reflexes has been employed in the field of law enforcement, in education, in personnel selection and counseling, in clinical psychology, and in various fields of psychiatry, such as psychosomatics.

In the past it has been customary to measure skin resistance by means of a D. C. energized Wheatstone bridge. Amplification of the bridge output has generally been accomplished by optical magnification of the deflection of a galvanometer connected in the output circuit. Recordirngs of electrodermal reflexes have been made by means of direct writing, or pen, oscillographs.

As indicated above, the electrodermal reflex varies among individuals, even for the same stimulus, and even though all other conditions are closely controlled. Phlegmatic individuals exhibit only small electrodermal reflexes. Hyperactive individuals sometimes exhibit such great electrodermal reflexes that their responses often overload the galvanometer connected in the bridge circuit.

In the analysis of the reflexes of phlegmatic individuals electrical amplification has proved to be of some assistance.

In the analysis of the reflexes of hyperactive individuals, two different methods have been employed to compensate for the extreme range of the variations in skin resistance. In one, the voltage applied to the Wheatstone bridge is reduced, thereby reducing the sensitivity of the apparatus. This system has the disadvantage that small reflexes of such individuals are not indicated. In the second method, the bridge is repeatedly rebalanced by the interrogator, or operator, in order to prevent overloading of the galvanometer. When employing the latter method of compensating for large reflexes, the interrogator is often distracted by his own manipulation of the apparatus. In addition, the manipulation of the apparatus itself by the interrogator may provoke such a response in the subject that electrodermal effects are produced that mask the reflexes that are to be measured. Furthermore, the use of this compensating method, in effect, shifts the zero level of the apparatus, thereby making it difficult for the operator to detect and measure anticipatory emotional trends of the subject.

In accordance with one feature of this invention, the aforementioned defects and disadvantages of prior apparatus are overcome by providing an electric amplifier having a first stage and a second stage. The first stage is in the form of a D. C. amplifier having a meter in its output for indicating the skin resistance of the subject at any time during the investigation. This stage has a logarithmic or other suitable non-linear characteristic to render it relatively sensitive to the reflexes of phlegmatic subjects while, at the same time, rendering it relatively insensitive to the wide amplitude excursions of the reflexes of a hyperactive subject. The second stage, which also has a meter in its output, is coupled to the output of the first stage through a condenser or other suitable reactive means in order to render the second stage responsive only to rapid or short period reflexes. With this arrangement the meter in the output of the first stage is employed to indicate anticipatory emotional trends while the meter in the second stage is employed to indicate transient effects.

Another feature of this invention resides in the employment of a reversing switch between the electrodes applied to the subject and the input of the amplifier. By reversing this switch periodically, unbalancing of the system or shifting of the zero because of polarization effects are minimized. The polarization in question arises from electrolysis of body salts of the subject.

In the investigation of a subject in prior art methods it has been customary for an investigator, or operator, to stimulate electrodermal reflexes by presenting a series of questions to the subject and to note the relative amplitudes of the corresponding reflexes. Errors in such analyses have sometimes been ascribed to variations in factors of which no record is made and over which close control could only be exercised by an experienced investigator.

In accordance with a feature of this invention, a phonographic recording is made both of the electrodermal reflexes and the questions which have provoked those reflexes. Thereafter, the recording is phonographically reproduced, thus facilitating an analysis of both the reflexes and the statements which have provoked them. With this system, it is possible for a relatively inexperienced operator to interrogate the subject with questions and for an experienced investigator to evaluate and interpret the results.

One feature of this invention resides in the employment of a carrier wave modulated in accordance with the series of electrodermal reflexes and the recording of this modulated wave on a recording medium simultaneously with the recording thereon of the questions which have provoked the reflexes.

Another feature of this invention resides in the provision of an amplifier having a pair of input circuits, one of which is employed to detect electrodermal reflexes and the other of which is employed to detect and demodulate a recording of a carrier wave that has been modulated in accordance with electrodermal reflexes.

Another feature of this invention comprises a switching arrangement for selectively connecting the aforementioned first and second input circuits to the amplifier and for connecting a carrier wave generator to the output of said amplifier only when the first input circuit is so connected.

The invention possesses numerous other features and advantages, some of which, together with the foregoing, are set forth in the following description of specific apparatus embodying and utilizing the novel method. It is therefore to be understood that the method of this invention is applicable to other apparatus and that the invention is not limited to the apparatus described in this specification, as various other apparatus embodiments utilizing the method may be adopted within the scope of the appended claims.

In the drawings:

Fig. 1 is a graph employed in explaining the invention;
Fig. 2 is an enlarged portion of the graph of Fig. 1; and
Fig. 3 is a schematic wiring diagram of apparatus according to the present invention.

Referring first to Figure 1, there is illustrated a graph representing the variations in skin resistance of a subject during the course of an interrogation by an operator of apparatus of the type to which this invention is applied. Ordinates in this graph represent D. C. skin resistance. Abscissae represent time, the measurements being indicated in minutes. As indicated by this graph, a series of questions have been presented to the subject at times indicated by the legends $Q_1$, $Q_2$, $Q_3$, $Q_4$, $Q_5$, $Q_6$, $Q_7$, $Q_8$, and $Q_9$. Changes in the general level of the graph represented by the specific curve C show a secular trend indicating that the skin resistance has generally increased during the course of interrogation reaching two successive peaks at the times the third and eighth questions were presented, the increase of resistance being due to a general increase of emotional tension by the subject in anticipation of future questions.

Immediately following the presentation of each of the respective questions, there are shown in the graph small pips $p_1$, $p_2$, $p_3$, $p_4$, $p_5$, $p_6$, $p_7$, $p_8$ and $p_9$. Each pip represents a diminution of skin resistance indicating the electrodermal reflex caused by increases in secretions from the sweat glands in response to the presentation of the corresponding immediately preceding questions. Some of the pips are large, some are small, and the shapes of the pips vary according to the subject's response to the questions. The changes in secular trend occur over relatively long periods of the order of a minute or more, while the transient phenomena represented by the pips occur over much shorter time intervals.

In Fig. 2, an enlarged graph of a single pip is illustrated. The curve represented in this graph comprises two main portions, an onset portion P produced by sweat gland secretion and a return portion Q caused by evaporation. The period of the onset portion varies between about 2 and about 5 seconds, depending upon the reaction and individual characteristics of the subject. The period of the return portion Q varies between about 10 to about 100 seconds, depending upon the physiological characteristics of the subject and upon other factors, such as temperature, humidity, and the like, the increase in resistance during the return being due almost entirely to evaporation of moisture from the skin. The relative amplitudes of the pips are employed as an index of the reactions to individual questions.

In accordance with this invention an electric amplifier is employed to measure both the secular trends and the transient electrodermal reflexes. The amplifier illustrated in Fig. 3 employs two stages, a preamplifier stage $A_1$ and a main amplifier stage $A_2$ having microammeters $M_1$ and $M_2$ respectively in their outputs. The microammeter $M_1$ is employed to indicate secular trends while the microammeter $M_2$ is employed to measure transient electrodermal reflexes. Suitable circuit arrangements including a switching circuit are provided, as more fully explained below, for recording and playing back the electrodermal reflexes. For convenience, the apparatus is first described below with the switching circuit in recording position.

The electrodermal reflex is defected by means of a pair of electrodes $E_1$ and $E_2$ that are attached at two points of the subject's skin; one, for example, being electrically connected to the subject's index finger, and the other being electrically connected to the subject's small finger of the same hand. The electrodes $E_1$ and $E_2$ are connected through a double-pole double-throw reversing switch $S_1$ between the signal grid $G_1$ and the filament $F_1$ of an amplifier tube $T_1$ in the preamplifier stage $A_1$. The skin resistance connected between the electrodes $E_1$ and $E_2$ forms part of a potential divider that also comprises a balancing resistance, the potential divider being connected across a battery $B_1$. The balancing resistance comprises a stepped resistor $R_1$ and a continuously variable resistor $R_2$, the battery and the two resistors being connected in series. By employing a preamplifier tube $T_1$ having a non-linear characteristic, the danger of overloading of the first microammeter $M_1$ by reflexes of a hypersensitive individual is minimized while still maintaining high sensitivity for phlegmatic subjects.

A load resistance $L_1$ and the microammeter $M_1$ are connected in series between the anode $P_1$ of the amplifier tube $T_1$ and a power supply bus U.

A coupling condenser $C_1$ is connected between the anode $P_1$ of amplifier tube $T_1$ and the signal grid $G_2$ of the amplifier tube $T_2$ of the main amplifier stage $A_2$. A grid leak resistor $R_3$ in the form of a potentiometer is connected between the grid $G_2$ and the filament $F_2$ of the amplifier tube $T_2$.

The amplifier tube $T_2$ possesses a diode section as well as an amplifier section. In this case the anode $P_4$ of the diode is connected to the junction between the condenser $C_1$ and the potentiometer $R_3$. The diode serves to prevent the grid $G_2$ of the amplifier tube $T_2$ from going positive, thereby precluding a reversal of current through the second microammeter.

A load resistor $L_2$ and the second microammeter $M_2$ are connected in series between the anode $P_2$ of the second amplifier tube $T_2$ and the bus U. A bucking circuit comprising a battery $B_2$ and a variable resistance $R_4$ shunts the second microammeter $M_2$.

Though the output of the second microammeter $M_2$ varies for a given electrodermal reflex in accordance with the total value of skin resistance, this is not a serious defect, since the total variation of electrodermal reflex for a given subject is not very great. In any event, by employing the microammeters $M_1$ and $M_2$ in the manner hereinafter described, both the peaks of tension and also the transient electrodermal reflexes are measured.

The output of the second amplifier stage $A_2$ is fed from the anode $P_2$ through a coupling condenser $C_2$ to the injection grid $G_3$ of a pentagrid oscillator tube $T_3$, the injection grid being connected to the negative pole of battery $B_1$ through a grid-leak resistor $R_5$. A load resistor $L_3$ is connected between the anode $P_3$ of the pentagrid converter $T_3$ and the bus U. The output of the pentagrid converter is supplied through a coupling condenser $C_3$ and isolation resistor $R_6$ to the sliding contact of an output potentiometer $R_7$.

An oscillator circuit O is connected to the pentagrid converter $T_3$ in such a way that the pentagrid converter normally oscillates at a predetermined carrier wave frequency.

Plate voltage is supplied to the bus U from a battery $B_3$. The pentagrid converter $T_3$ and the preamplifier tube $T_1$ are biased by means of a battery $B_1$. The battery $B_4$ supplies filament power.

In preparing the apparatus above for analyzing a subject, the electrodes $E_1$ and $E_2$ are connected to the subject in the manner described above. Then the resistances $R_1$ and $R_2$ are adjusted to such a value that the first microammeter $M_1$ reads some predetermined amount near the middle of the scale. Then the variable resistance $R_4$ in the bucking circuit is adjusted to cause the second microammeter to read zero. Then a few preliminary questions are asked and the sensitivity of the instrument is adjusted by manipulation of the slide wire contact on the potentiometer $R_3$.

With the apparatus thus prepared for use, a series of test questions are then presented to the subject by the investigator and the amplitude of the electrodermal reflexes measured by observing the deflection of the microammeter $M_2$ in the second amplifier stage $A_2$. Concurrently, from time to time the general emotional condition of the subject is determined by observing the deflection of the microammeter $M_1$ in the preamplifier stage $A_1$. Periodically, during the examination, say at about two-minute intervals, the switch $S_1$ is reversed in order to eliminate any errors that might otherwise occur because of polarization between the electrodes $E_1$ and $E_2$ and the skin. A condenser $C_5$ in the input of the first amplifier tube $T_1$ minimizes any shock the electrical system might otherwise receive when the switch $S_1$ is reversed. Condenser $C_5$ also filters out any A. C. voltage induced in the subject's body by exposure to any A. C. field, such as that produced by a 60 C. P. S. power line.

It will be noted that when the electrodermal resistance decreases, the bias on the signal grid $G_1$ of the amplifier tube $T_1$ likewise decreases, thus causing the voltage appearing at the anode $P_1$ to increase. Thus, in effect, an electrodermal reflex produced by increased sweat gland secretion causes a positive change in voltage to be impressed upon the signal grid $G_1$ of the first amplifier tube $T_1$. Also, when the sweat gland secretion causing the electrodermal reflex increases, the coupling condenser $C_1$ is discharged by the current flowing to the grid $G_2$ of the amplifier tube $T_2$.

With this apparatus, the onset portions P of the pips $p_1 \ldots p_9$ vary at about their correct or normal rate, but the return portions Q are highly distorted, being somewhat foreshortened. This result is achieved by establishing a time constant for the coupling network $R_3C_1$ at about 8 to about 10 seconds as well as by virtue of the fact that when the current flowing to the anode $P_1$ of the first tube $T_1$ begins to fall, the coupling condenser $C_1$ is discharged by the current flowing from the grid $G_2$ of the second amplifier tube $T_2$ to its cathode $F_2$. The time constant of the coupling network $R_5C_2$ is also set at about 8 to 10 seconds to enhance this effect.

According to the present invention, the output of the main amplifier $A_2$ is employed to modulate the amplitude of a carrier wave generated by the oscillator tube $T_3$. The modulated carrier wave appearing across the output potentiometer $R_7$ is fed to a recorder RR that is also adapted to function as a reproducer. At the same time, electrical waves generated by the voice of the investigator in a piezo-electric microphone Z are fed to the recorder RR.

In order that the voice signals and the modulated carrier wave signals may be recorded simultaneously on a single track or trace, the voice signals are transmitted to the recorder RR through a low pass filter LPF and the oscillator O is tuned to a frequency above the cutoff frequency of the low pass filter. Thus, for example, a low pass filter is selected having a cutoff frequency at about 4500 C. P. S. and the frequency to which the oscillator circuit O is tuned is about 5500 C. P. S. With this arrangement, intelligible voice signals and the modulated carrier wave may be recorded together as a single trace or track.

If a magnetic tape recorder is employed, the mixed signals impressed upon the input of the recorder RR are amplified by means of an amplifier $A_3$ and then impressed upon a recording head H that records the mixed signals on a moving magnetic tape T. The phonographically reproducible record thus produced may be played back by the recorder RR through the amplifier $A_3$, the output signal being impressed upon a loudspeaker K and also being supplied to an output jack $J_1$ in conventional manner. The output appearing at the output jack $J_1$ is led through a cable W to an input jack $J_2$ that supplies a high pass filter HPF having a cutoff frequency of the same value as that at the low pass filter LPF or higher, such as 4500 C. P. S. The output of the high pass filter HPF is demodulated by means of a demodulator circuit D and the output of the demodulator circuit D is supplied to the grid circuit of the main amplifier $A_2$.

With this arrangement the signals on the phonographically reproducible record formed by the magnetic tape T may be reproduced and interpreted at any time desired. In the course of such reproduction, the questions or other statements which were presented to the subject under investigation may be heard in the loudspeaker K while the corresponding electrodermal reflexes may be measured by means of the microammeter $M_2$. An investigator is able to make rough estimates of the electrodermal reflexes merely by listening to the variations in amplitude of the carrier wave as it is reproduced by the loudspeaker K.

In practice, a switching circuit comprising six ganged switches $S_2$, $S_3$, $S_4$, $S_5$, $S_6$ and $S_7$, is employed to connect the amplifier and oscillator either for recording or for reproducing electrodermal reflexes. The six switches have three positions, a central or "off" position, and a left or "record" position, and a right or "play back" position. In the record position, switch $S_2$ is inoperative, but in the play back position it serves to ground the reversing switch $S_1$ and the variable resistance comprising the resistors $R_1$ and $R_2$. In the record position, switch $S_3$ connects the negative pole of battery $B_1$ to the sliding contact of the variable resistance $R_2$, but in the play back position it is inoperative. In the record position, the switch $S_4$ connects the signal grid $G_2$ of the amplifier tube $T_2$ to the coupling condenser $C_1$ but in the play back position the signal grid $G_2$ is connected to the output of the demodulator circuit D. In both the record and the play back position, the switch $S_5$ connects the battery $B_3$ to the bus U. In both the record and play back positions, the switch $S_6$ connects the bias battery $B_4$ to the filaments $F_1$ and $F_2$ of the amplifier tubes $T_1$ and $T_2$. In the record position, the switch $S_7$ is inoperative but in the play back position it connects the battery $B_4$ in biasing relationship to the pentagrid converter $T_3$.

With this switching arrangement the switch $S_4$, in effect, is employed to selectively connect one input circuit comprising the high pass filter HPF and the demodulator circuit D or another input circuit comprising the electrodes $E_1$ and $E_2$ and the preamplifier $A_1$ together with their associated circuit elements, to the input of the main amplifier $A_2$. In other words, in the record position of the switch $S_4$ (the left position as shown in the drawing), voltage changes occurring between electrodes $E_1$ and $E_2$ are applied to the control grid $G_2$ through amplifier tube $T_1$ and condenser $C_1$. But in the play back position of switch $S_4$, the demodulator D is connected to the control grid $G_2$. It will be noted that when the switches $S_2 \ldots S_7$ are in their play back position, both the input circuit including the preamplifier $A_1$ and the modulator circuit including the pentagrid converter $T_3$ are rendered inoperative, these circuits then being effectively disconnected so as not to interfere with or be affected by the reproduction of the electrodermal reflexes by the main amplifier $A_2$.

Though the invention has been described by reference to interrogation by means of questions, it is to be understood that it may be also employed when other forms of declarations such as simple statements or even single words are employed by an investigator to provoke the reflexes. It will also be understood that the invention is applicable to systems which respond to other types of physiological reflexes.

Although one particular form of the invention has been specifically disclosed, it will be obvious that the invention is not limited thereto but is capable of a wide variety of mechanical and electrical embodiments. Various changes which will now suggest themselves to those skilled in the art may be made in the material, form, details of construction, and arrangement of the elements without departing from the principles of the invention. Reference is therefore to be had to the appended claims to ascertain the scope of the invention.

The invention claimed is:

1. In apparatus for the physiological analysis of a subject who manifests physiological reflexes in response to his stimulation by declarations of an investigator, the combination which comprises: a recorder for recording electrical waves as a phonographic record, means for translating physiological reflexes into corresponding electric waves, a carrier wave generator, means for modulating the carrier wave produced by said generator in accordance with said electric waves, means for translating the sound waves constituting said declarations into other corresponding electric waves, and means for simultaneously impressing said last mentioned electric waves and said modulated carrier wave on said recorder.

2. In apparatus for the physiological analysis of a subject who manifests physiological reflexes in response to stimulation by declarations of an investigator, the combination which comprises: a recorder for recording electrical waves as a phonographic record, means for translating such physiological reflexes into corresponding electric waves, means for translating the sound waves constituting said declarations into other corresponding electric waves, means for filtering out from said last mentioned electric waves frequency components in a predetermined range, means for generating a carrier wave having a frequency in said range, means for modulating the carrier wave produced by said generating means in accordance with said first mentioned electric waves, and means for simultaneously impressing said filtered electric waves and said modulated carrier wave on said recorder.

3. In apparatus for the physiological investigation of a subject who manifests physiological reflexes in response to his stimulation by declarations of an investigator, the combination which comprises: a recorder for recording electrical waves as a phonographic record, means for translating the sound waves constituting said declarations into other corresponding electric waves, a low pass filter for filtering out from said last mentioned electric waves frequency components higher than a predetermined frequency in the voice-frequency range, means for translating physiological reflexes into corresponding electric waves, means for generating a carrier wave having a frequency higher than said predetermined frequency, means for modulating the carrier wave produced by said generating means in accordance with said first mentioned electric waves, and means for simultaneously impressing said filtered electric waves and said modulated carrier wave on said recorder.

4. In apparatus for the physiological investigation of a subject who manifests physiological reflexes, the combination which comprises: means for converting said physiological reflexes into corresponding electrical waves; an electric amplifier having an input and an output, means for impressing said electric waves corresponding to such physiological reflexes upon the input of said amplifier, a generator of carrier waves controlled by said output whereby a carrier wave is modulated in accordance with such reflexes, means including a rectifier connectable to said input for demodulating such a modulated carrier wave; and means for indicating the output of said amplifier while demodulated signals are impressed on the input thereof.

5. In apparatus for the physiological investigation of a subject who manifests physiological reflexes, the combination which comprises: means for converting said physiological reflexes into corresponding electrical waves; an electric amplifier having an input and an output, a first input circuit including means for impressing electric waves corresponding to such physiological reflexes upon the input of said amplifier, a generator of carrier waves controllable by said output whereby a carrier wave is modulated in accordance with such reflexes, a second input circuit including means for demodulating such a modulated carrier wave, an indicating meter connected in said output, and switching means for selectively connecting said first and second input circuits to said amplifier input and for connecting said generator in said amplifier output only when said first input circuit is connected to said amplifier input.

6. In apparatus for the investigation of a subject who manifests physiological reflexes in response to his stimulation by declarations of an investigator, the combination which comprises: means for converting said physiological reflexes into corresponding electrical waves; an electric amplifier having an input and an output, means for impressing electric waves corresponding to such physiological reflexes upon the input of said amplifier, a generator of carrier waves having a carrier wave frequency higher than said cutoff frequency, said generator being controlled by said output whereby a carrier wave is modulated in accordance with such reflexes, a low pass filter having a cutoff frequency in the voice-frequency range, said low pass filter having an input and an output, said input being connectable to a microphone that translates sound waves constituting said declarations into corresponding electrical waves, means for impressing said modulated carrier wave and the output of said filter upon a phonographic recorder, a rectifier connectable to said amplifier input for demodulating such a modulated carrier wave, and a high pass filter having such a cutoff frequency for feeding reproductions of such recorded modulated carrier wave to said rectifier without interference from recorded sound waves.

7. In apparatus for the physiological analysis of a subject who manifests physiological reflexes, the combination which comprises: a recorder for recording electrical waves as a phonographic record, means for translating such physiological reflexes into corresponding electric waves, a carrier wave generator, means for modulating the carrier wave produced by said generator in accordance with said electric waves, and means for applying the modulated carrier wave to said recorder, whereby a recording of said modulated carrier wave is produced.

8. In apparatus for physiological analysis of a subject who is stimulated by declarations of an investigator: detecting means responsive to physiological reflexes of the subject resulting from such stimulation; means controlled by said detecting means for generating a carrier wave that is modulated in accordance with such reflexes; and means for concurrently phonographically recording said declarations and the modulated carrier wave.

9. In apparatus for physiological analysis of a subject who is stimulated by declarations of an investigator: detecting means including a pair of leads adapted for connection to the skin of a subject under investigation for detecting electrodermal reflexes of the subject resulting from such stimulation; means controlled by said detecting means for generating a carrier wave that is modulated in accordance with changes in the skin resistance of the subject; and means for concurrently phonographically recording said declarations and the modulated carrier wave.

10. In apparatus for physiological analysis of a subject who is stimulated by declarations of an investigator: means for detecting physiological reflexes resulting from such stimulation, and for producing electrical signals corresponding thereto; means for translating the sounds that constitute said declarations into an electric wave train consisting of electrical waves having the same frequency components as said sounds; means for filtering out from said wave train electrical components in a predetermined frequency range; means for generating a carrier wave having a frequency in said range; means controlled by said electrical signals for modulating a carrier wave in accordance with such reflexes; and means for concurrently phonographically recording said declarations and the modulated carrier wave.

11. In apparatus for physiological analysis of a subject who is stimulated by declarations of an investigator, means connectable to said subject for detecting resultant physiological reflexes, means for modulating a carrier wave in accordance with such detected reflexes, means for simultaneously phonographically recording said declarations and the modulated carrier wave on a recording medium, means for subsequently reproducing said recording by translating the recorded declarations into sound waves, means for subsequently translating the recording of the modulated carrier wave into a train of electrical waves having amplitudes corresponding to the magnitures of such reflexes, and means for measuring said amplitudes.

12. In apparatus for physiological analysis of a subject who is stimulated by declarations of an investigator, means connected to said subject for detecting resultant physiological reflexes, means for translating the sounds that constitute said declarations into an electrical wave train consisting of electrical waves having the same frequency components as said sounds, means for filtering out from said wave train electrical components in a predetermined frequency range, means for generating a carrier wave having a frequency in said range, means for modulating said carrier wave in accordance with such reflexes, means for simultaneously phonographically recording said declarations and the modulated carrier wave on a recording medium, means for reproducing such recording by translating the recorded declarations into sound waves, means for translating the recording of the modulated carrier wave into a train of electrical waves having amplitudes corresponding to the magnitudes of such reflexes, and means for measuring said amplitudes.

13. In apparatus for the physiological analysis of a subject who manifests physiological reflexes in response to stimulation by a series of declarations of an investigator, the combination which comprises: first means including a first electrical network and a first meter connected therein for measuring and indicating the electrical resistance between two points of the subject's body during the course of presentation of said series of declarations, said first means being responsive to slow variations in the voltage applied to the input thereof, second means including a second electrical network and a second meter connected therein for measuring transitory changes of electrical resistance between two points of the subject's body in response to individual declarations in said series whereby both the general emotional condition and the transient electrodermal reflexes are indicated concurrently, said second means being responsive only to rapid changes in the voltage applied to the input thereof, and means including a pair of terminals connectable to two points of the subject's body for applying to each of said inputs a voltage that varies as a function of the electrical resistance between said two points.

References Cited in the file of this patent

UNITED STATES PATENTS 2,535,249     Wilhelm _____ Dec. 26, 1950